Nov. 29, 1966 R. JURK ETAL 3,289,163

CIRCUIT FOR SUPPRESSING SCANNER-SIGNAL DEFICIENCIES IN SYSTEMS FOR IDENTIFICATION OF CHARACTERS

Filed April 9, 1964

United States Patent Office
3,289,163
Patented Nov. 29, 1966

3,289,163

CIRCUIT FOR SUPPRESSING SCANNER-SIGNAL DEFICIENCIES IN SYSTEMS FOR IDENTIFICATION OF CHARACTERS

Rolf Jurk and Norbert Schurzinger, Munich, Germany, assignors to Siemens & Halske Aktiengesellschaft, Berlin, Germany, a corporation of Germany Filed Apr. 9, 1964, Ser. No. 358,498
Claims priority, application Germany, Apr. 11, 1963, S 84,675
4 Claims. (Cl. 340—146.3)

Figure 1:
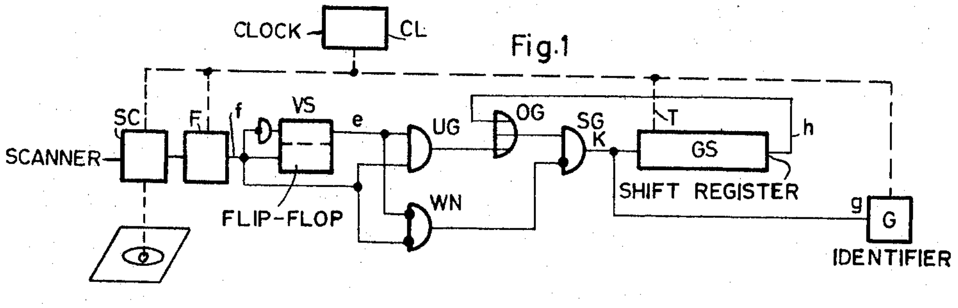

Our invention relates to systems for automatically identifying alphabetic letters, numerals, symbols and other characters by scanning the characters and processing the resulting electric signals in storing and comparing devices.

More particularly, our invention relates to circuits which in such systems transfer the signals from the signal producing scanner to signal processing equipment, and has for its primary object to minimize any signal disturbances as may be caused by inadvertent or accidental irregularities in the characters being identified.

The automatic identification of legible characters is often effected on the basis of its so-called form elements or signature components. The scanning required for this purpose is effected, for example, in parallel columns, such as by an optical scanner; and the resulting scanner-signal elements, corresponding either to an area element of the character proper or to an area element of the background, are utilized for the recognition of such form elements. The identifying operation on this principle is based on the assumption that a character being scanned possesses just those form elements as are contained in an ideally shaped character of the same meaning.

In practice, however, virtually all characters depart more or less from their ideal shape. The departures may consist, for example, of ragged edges, holes in the blackened area of the character, or smearing of the blackened area. Although, as a rule, such irregularities are limited, they tend to interfere with the proper automatic identification of the characters. This is because if the character-forming lines are not fully uniform or not sharply limited, the identifying equipment may ascertain the existence of form elements that do not occur in the ideal shape of the character, at least not at the particular locality, thus aggravating, preventing or even falsifying the identification of the particular character.

It has become known to eliminate error signals caused by irregularities and lack of clarity in the character being read, by comparing those scanner-signal elements that correspond to each other in two or more scanning columns, and to have the identifying logic components respond only to changes in scanner-signal condition if these extend over two or more sequential scanning columns. In this manner, the scanned characters are subjected, so to say, to smoothing of their contours. This is done with the aid of a smoothing device in which the scanner-signal elements stemming from each scanning column are supplied from the scanner to one input of one of two AND gates connected ahead of the respective two inputs of a bistable flip-flop stage. The same scanner-signal elements are applied to a negator (inverter) connected ahead of the input of the second AND gate, and are also passed through a shift register to the other input of the first AND gate and through another negator to the other input of the second AND gate. The shift register has a storage capacity sufficient for simultaneously storing all of the scanner-signal elements contained in a scanning column.

Such a device permits smoothing the left side of a character or character portion by an action essentially consisting in the elimination of black protuberances, and smoothing the right side by filling any white gaps between black protuberances. However, irregularities at the upper and lower edges of the character contour cannot be eliminated. In this respect, the known devices leave much to be desired because irregularities of the latter type are often encountered and may likewise result in incorrect or falsified recognition of certain form elements.

It is therefore another, more specific object of our invention to provide a signal transfer circuit that avoids the shortcomings of the known devices and is capable of reliably suppressing defects in scanning signals stemming from character irregularities at any location, including the upper and lower portions, of a character being scanned.

To this end, and in accordance with our invention, a circuit for suppressing character-irregularity defects in signals produced by columnar scanning of characters to be identified is composed and organized as follows. The signal elements from the scanner are supplied to one input of an AND gate and one input of a NOR gate as well as to the input of a bistable flip-flop stage. The respective other inputs of the two gates are connected to the output of the flip-flop stage. The output of the NOR gate is directly connected with the lock-out input (not-input) of an inhibit gate, and the output of the AND gate is connected through an OR gate with the main input of the same inhibit gate. The output of the inhibit gate leads to a shift register whose storage capacity permits simultaneous storing of all of the scanner-signal elements resulting from a single scanning column. The output of the shift register is connected through the other input of the OR gate with the main input of the above-mentioned inhibit gate.

The scanner-signal elements entering into the input lead of such a circuit system may exhibit defects, such as those resulting from the scanning of isolated white or black area elements not appertaining to the character proper. The output of the above-mentioned inhibit gate, however, furnishes the scanner-signal elements substantially freed of any such deficiencies, and these corrected signals are available for supply to character-identifying circuitry of any suitable type or design, not forming part of the present invention.

The invention will be further explained with reference to the accompanying drawings in which:

FIG. 1 shows schematically a signal correction circuit according to the invention; and FIGS. 2 to 7 are explanatory diagrams relating to the operation of the circuit.

The input lead *f* of the circuit shown in FIG. 1 receives the signal elements produced in a scanner SC during columnar scanning of a character to be identified. The signal elements correspond either to an area element on which a portion of the character is located, or to an area element of the background. In the following, the term scanner-signal element "1" is applied to a signal element corresponding to an area element of the character proper, such a signal being often called "black signal," although the character may have any other color. The term scanner-signal element "0" is understood to mean a signal element that does not correspond to an area element covered by a portion of the character. The latter signal is often called "white signal" regardless of the actual color of the background. The scanner signals, therefore, are of the binary type, and the duration of each signal element corresponds to a step length along a sweep (scan) of the scanning operation.

Figure 6:
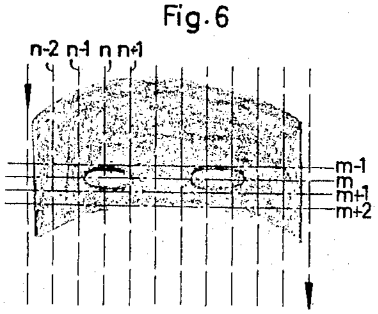

The scanner SC is preferably of the optical type. The characters to be viewed, such as those printed on a sheet of paper, are scanned in narrow parallel strips, and the electric pulses resulting, for example photoelectrically, from the dark and light areas, are issued as the scanner signal elements. The scanner SC is shown connected by a synchronizing line T to a synchronizing generator CL (master clock). Details of the scanner are not illustrated and described herein because various optical scanners suitable for the purposes of the invention are known and commercially available as separate components, and because the particular details of the scanner are not essential to the invention proper. Reference may be had, for example, to the above-mentioned U.S. Patent 2,877,951 (FIGS. 6 and 50). Such scanners are available, for example, from the assignee of the present invention or from the manufacturers listed under "Optical Scanning" on pages 52 to 54, in No. 10 of Computer Equipment Comparison Series, published by McGraw-Hill Publishing Company, Inc., New York.

The signal input lead $f$ connects the scanner SC to one of the two inputs of an AND gate UG, also to one of the two inputs of a NOR gate WN, and further to the input (set input) of a bistable flip-flop stage VS. Connected to the output of flip-flop stage VS are the respective other inputs of the two gates UG and WN. The output of the NOR gate WN is connected to the lock-out input of an inhibit gate SG whose output is connected to the input of a shift register GS. The shift register has a storage capacity sufficient for simultaneously storing all of the scanner-signal elements that may occur within a single scanning column (scan). In other words, the shift register has a length corresponding to that of a full single scan. The output of the shift register SC is connected with the main input of the inhibit gate SG, a de-coupling OR gate OG being interposed. The other input of gate OG is connected to the output of AND gate UG.

Figure 2:
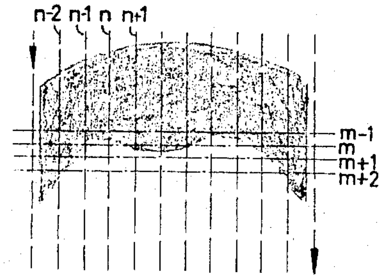

The operation of the circuit shown in FIG. 1 will be described presently with reference to FIGS. 2 to 4. FIG. 2 shows greatly enlarged and by way of example the upper portion of the numeral 0. This character is being scanned by successive vertical scans indicated in FIG. 2. As schematically shown in FIG. 1, the scanning is timed by clock pulses supplied from a synchronizing generator (master clock) CL which also supplies clock pulses through line T to the shift register GS. During each individual scan, the scanning point travels one step for each clock pulse in the downward direction commencing with the left-hand scan and repeating the operation successively in each following vertical scan. Depending upon whether during the scanning travel the point impinges upon an area element covered by a portion of the character being scanned, or whether it impinges upon an area element not so covered, a scanner signal "1" or a scanner signal "0" is produced.

Figure 3:
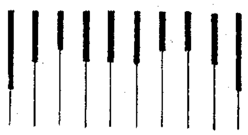
Figure 7:
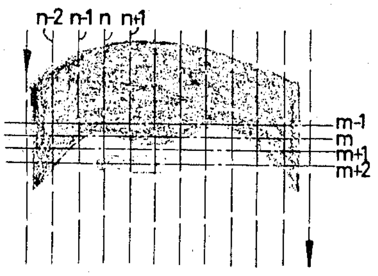
Figure 4:
Figure 5:
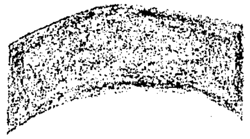

FIG. 3 shows schematically the scanner-signal conditions resulting from the scanning of the character portion shown in FIG. 2. Each individual scan in FIG. 3 is represented by a thin line along those stretches where the scanning point does not encounter an area element covered by the character portion, and by a heavy line along the stretches where the scanning point travels over an area element covered by the character portion. If one traces in FIG. 3 the junction points between the thin and heavy line portions, these junctions will be recognized to jointly form a curve extending transversely of the scanning area and corresponding to the lower boundary of the character portion shown in FIG. 2.

This lower boundary in FIG. 2 is not regular but exhibits a disturbance in the form of two small upward bulges with an intermediate downward bulge. Consequently, when this character portion is being scanned, the two upward bulges result in the production of scanner-signal elements "0" which would not occur if an ideally shaped character 0 were scanned and which therefore constitute error signals.

Such error signals are suppressed by the circuit according to FIG. 1 as will be explained presently.

From the signal input line $f$, each scanner-signal element arrives at one of the inputs of the AND gate UG and of the NOR gate WN, as well as at the input of the bistable flip-flop VS. Simultaneously available at the output of the bistable flip-flop VS is the one scanner-signal element that immediately preceded in the particular column just being scanned. If both of these directly successive scanner-signal elements are black elements "1," then the coincidence condition is established for the AND gate UG, and a signal element "1" is written through the OR gate OG and the inhibit gate SG into the shift register GS. This signal element "1" is thereafter shifted through the shift register GS in synchronism with the operation of the identifying performance, due to the fact that the shift control pulses for the shift register GS are supplied from the master clock CL of the equipment. After a register-shift interval identical with the one required for scanning a single column, the signal element "1" appears at the output $h$ of the shift register GS. Thence this particular signal element "1" is again written into the shift register GS through the OR gate OG, if the inhibit gate SG is not blocked at this moment and thus does not prevent the repeat entering of the same signal. Since the lock-out input of inhibit gate SG is connected to the NOR gate WN, the re-writing of a signal element "1" into the shift register GS is prevented, if at the particular moment there occurs on the signal input lead $f$ a scanner signal element "0" directly subsequent to another scanner signal element "0" from the same scanning column. This is because under such conditions the signal "0" obtains simultaneously on the input line $f$ and on the output $e$ of the flip-flop VS, thus establishing coincidence for the NOR gate WN.

When during scanning of the column $n-1$ in FIG. 2, the scanning point, traveling downwardly, arrives at line $m$, there occurs a scanner signal element "1" at the one input of the AND gate UG connected to the signal input lead $f$, as well as at the other input lead of the same gate which is connected with the output $e$ of the bistable flip-flop VS. This double appearance of the signal element "1" comes about as follows. One signal element "1" corresponds to the area element covered by the character and located in scan $n-1$ on line $m$. The other signal element "1" corresponds to the character area element determined by the same scan $n-1$ and the preceding line $m-1$. Consequently, at the moment when the scanning point in column $n-1$ arrives at the height of line $m$, the coincidence condition for the AND gate UG is met, so that at this moment a signal element "1" is written into the shift register GS. This signal element appears simultaneously in the signal output lead $g$ connected to the output $k$ of the inhibit gate SG together with the input of the shift register GS. The output lead $g$ supplies the signal element to the identifying devices schematically indicated at G.

Now assume that the scanning point during further scanning arrives in the next following column $n$ at the height of line $m$. The signal input lead $f$ of the circuit now receives a scanner signal element "0." At the same moment the directly preceding scanner signal element "1" appears at the output $e$ of the flip-flop VS. This does not meet the coincidence requirements of AND gate UG so that no signal element "1" is transferred through this gate to the inhibit gate SG. Nevertheless a signal element "1" occurs at the output $k$ of the inhibit gate SG, namely the one signal element that was written into the shift register GS during the preceding scan $n-1$ at the height of line $m$. At the moment here in view, the latter signal element "1" appears at the output $h$ of shift register GS and passes through the OR gate OG and the inhibit gate SG to the output $k$ of the latter gate. This signal element "1" therefore again occurs on the signal output lead $g$ of the circuit, despite the fact that the corresponding area element, determined by scan $n$ and line $m$, is not covered by the character being scanned.

After the next synchronizing clock pulse of the character identifying equipment, that is when the scanning in column $n$ has reached the height $m+1$, a scanner signal element "0" occurs on the signal input lead $f$, as well as on the output $e$ of flip-flop VS. Now coincidence is established for the NOR gate WN. As a result, the inhibit gate SG is blocked to the signal element "1" now arriving at the output of shift register GS, this signal element "1" being the one that was first written into the shift register GS when scanning the area element in scan $n-2$ at line $m+1$ and which was again written into the same register when scanning the area element in scan $n-1$ at line $m+1$. The closed inhibit gate GS now prevents this signal element "1" from being written into the shift register another time; and the signal output lead $g$ now issues a signal element "0" corresponding to the "0" element received on the input line $f$.

When in the next following column $n+1$ the scanning point reaches the height of line $m$, coincidence is again established for the AND gate UG, so that a signal element "1" is written into the shift register GS and simultaneously issued to the signal output lead $g$. When immediately thereafter the scanning point in the same column $n+1$ arrives at the next line $m+1$, no coincidence exists for AND gate UG and NOR gate WN; and no signal element "1" appears at the output $h$ of the shift register GS because, as explained above, the inhibit gate SG was blocked in the preceding scan $n$ at line $m+1$ so that no signal element "1" was written into the shift register GS. Consequently, when the line $m+1$ is reached in the scanning column $n+1$, a signal element "0" issues to the output lead $g$.

The circuit operates analogously during further scanning of the character portion shown in FIG. 2. In lieu of the scanner signals arriving on signal input lead $f$ as schematically represented in FIG. 3, the output lead $g$ of the circuit issues signals as schematically represented in FIG. 4 where the continuance of signal condition "1" within each individual scan is indicated by a heavy line portion and the existence of signal condition "0" by a thin line portion. The bulges of the transverse curve formed by the lower ends of the heavy portions in FIG. 3 are no longer apparent from FIG. 4. That is, the error signals manifested by such bulges and resulting from irregularities of the character being scanned, are effectively suppressed. The output lead $g$ of the circuit therefore furnishes signal elements as they would be obtained, without the interposition of the circuit according to the invention, if the character portion being scanned were entirely regular, such as the one shown in FIG. 5. Hence, such irregular bulges have no influence upon the character identifying circuitry to be connected to the error-suppressing circuit according to the invention.

While the foregoing explanation particularly relates to the suppression of error signals occurring during scanning of a character portion that exhibits irregularities at its lower edge, a circuit according to the invention suppresses in the same manner any error signals resulting from irregularities in the upper boundary of a character portion being scanned. Furthermore, such a circuit also eliminates or minimizes error signals stemming from other irregularities, such as from a white area element isolated within a black portion of the character, or an isolated black area element located on the background away from the character proper. In all such cases, a circuit according to the invention issues a corrected signal substantially or fully corresponding to the one produced by the scanning device if such isolated and disturbing area elements are not present. This will be further explained with reference to FIG. 2 in conjunction with FIG. 6.

As mentioned above, the scanner signal element "0" is produced when the scanning point in column $n$ reaches the area element determined by line $m$ (FIG. 2), but the circuit according to the invention furnishes an output signal element "1" in lieu of the element "0." This substitution by signal element "1" is independent of those signal elements which correspond to the elements located in the next following line $m+1$. Now assume that, contrary to FIG. 2, only black area elements are located within the illustrated character portion on line $m+1$ as is indicated in FIG. 6. Then a signal element "1" is issued by the circuit also for the white area element determined by scan $n$ and line $m$, as if the isolated white area element were not present. The circuit according to the invention functions in the same manner also with respect to any other isolated white area elements on line $m$.

As mentioned, the circuit according to the invention also suppresses error signals stemming from the scanning of isolated small black areas. For explanation, again refer to the conditions represented in FIG. 2 and assume additionally that a black area element is located at the place determined by scanning column $n+1$ and line $m+2$, this being represented in FIG. 7. Then a scanning signal element "1" arrives on the signal input lead $f$ of the circuit shown in FIG. 1 when the scanning point passes over the isolated black area element. However, the coincidence condition for the AND gate UG is not satisfied, so that no signal element "1" appears at its output. Likewise, no signal element "1" occurs at the output $h$ of the shift register GS because, when in the preceding scanning column $n$ the line $m+2$ was reached, the coincidence condition for the NOR gate WN was not met so that the inhibit gate SG was blocked and hence no signal element "1" was written into the shift register GS. Consequently when in column $n+1$ the line $m+2$ is reached, the signal output lead $g$ furnishes a signal element "0" even though the area element at scan $n+1$ and line $m+2$ is black. In this manner, the effect of an isolated black area element upon the signal is suppressed; and the circuit operates in an analogous manner if black area elements are located for example in the next following scanning columns on the height of line $m+2$.

As a rule, a single error correcting circuit according to the invention is sufficient. However, in cases where the characters are to be scanned exhibit a rather large amount of irregularities of the above-mentioned kind, the signals can be passed twice or more times through a circuit according to the invention. This can be done, for example, by connecting a plurality of circuits according to FIG. 1 in series, the output lead $g$ of each preceding circuit being connected to, or identical with, the input lead $f$ of the next following circuit. In this manner, relatively large irregularties in the shape of a character portion or relatively large isolated area elements can be eliminated as regards their effect upon the output signals thus made available for character identification.

While in the embodiment described above with reference to FIG. 1, the signal output lead $g$ is connected to the output $k$ of the inhibit gate SG, it may also be connected to the output $h$ of the shift register GS. This is of advantage for example, when the scanning signal elements are subjected to further processing parallel to the operation of the suppression of error signals according to the invention, and such further processing makes it desirable to delay the scanner signal elements by the length of a scanning column.

It will be understood that additional auxiliary circuits may be interposed at F in FIG. 1 between the scanner SC and the circuit according to the invention, for such purposes of correcting errors of other kinds.

Many of the known or commercially available components are applicable with respect to the gates, flip-flop stages and the shift register shown in FIG. 1. In this respect, reference may be had, for example, to such publications as Computer Basics, published 1962 by Howard W. Sams Co., Inc., New York, N.Y., and Indianapolis, Ind., volumes 4 and 6. We preferably employ transistor flip-flops and other solid state semiconductor componenets, for example, those shown in the German publications: "Entwicklungsberichte der Sieman & Halske AG,"

vol. 22, part 2, pages 159 to 171, August 1959; "Nachrichtentechnische Fachberichte," vol. 14, 1959, pages 25 to 29.

To those skilled in the art, it will be obvious upon a study of this disclosure, that our invention permits of various modifications and hence can be given embodiments other than particularly illustrated and described herein, without departing from the essential features of our invention and within the scope of the claims annexed hereto.

We claim:

1. A circuit for suppressing character-irregularity defects in signals produced by columnar scanning of characters to be identified, comprising a signal input lead, an AND gate and a NOR gate and a bistable flip-flop stage having respective inputs connected to said signal input lead, said two gates having respective second inputs connected to the output of said flip-flop stage, an inhibit gate having a lock-out input connected with the output of said NOR gate and having another input, an OR gate having an input connected to the output of said AND gate and having an output connected with said other input of said inhibit gate, a shift register connected to the output of said inhibit gate and having a bit storage capacity sufficient for simultaneous storage of the scanner signals receivable by said signal input lead during a scan column, said register having an output connected with another input of said OR gate, and a signal output lead connected to a circuit point subsequent to said inhibit gate, whereby character-irregularity defects of signals received at said input line are reduced in the signals issuing at said output line.

2. In a circuit for suppressing signal defects according to claim 1, said signal output lead being connected to said output of said inhibit gate.

3. In a circuit for suppressing signal defects according to claim 1, said signal output lead being connected to said output of said shift register.

4. A network for suppressing character-irregularity defects in signals produced by columnar scanning of characters to be identified, comprising a plurality of circuits according to claim 1 connected in series, said signal output lead of one of said circuits being the signal input lead of the serially next circuit.

No references cited.

MAYNARD R. WILBUR, *Primary Examiner.*

DARYL W. COOK, *Examiner.*

J. E. SMITH, *Assistant Examiner.*